Figures 1, 2, 3:
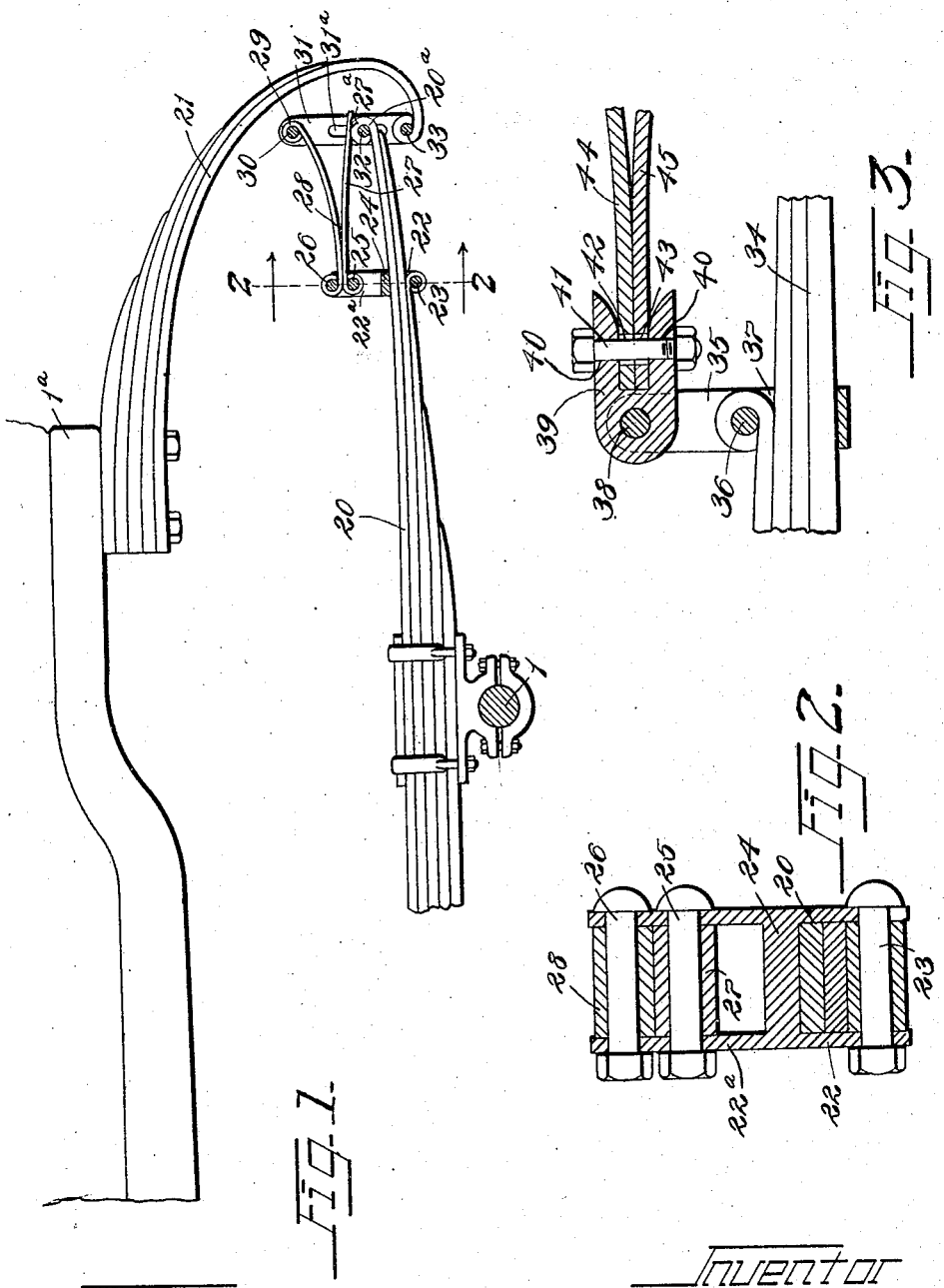

M. M. McINTYRE.
VEHICLE SPRING.
APPLICATION FILED MAR. 4, 1915.

1,327,958.

Patented Jan. 13, 1920.

Witnesses
H. Duvall
R. L. Bruck

Inventor
Michael M. McIntyre,
Hull & Smith,
Attys

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,327,958.

Specification of Letters Patent.

Patented Jan. 13, 1920.

Application filed March 4, 1915. Serial No. 12,141.

*To all whom it may concern:*

Be it known that I, MICHAEL M. MC-INTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to the suspension of vehicle body springs and more particularly to a combination of springs, with each other and with the frame and axle whereby the benefits of a "shock absorber" may be obtained while the ease of riding of the vehicle under ordinary conditions is greatly enhanced.

Further and more generally, the invention may be defined as consisting of the combinations of elements embodied in the claims hereto annexed and illustrated in the drawings forming part hereof, wherein Figure 1 represents an elevation of part of a vehicle axle and frame showing one embodiment of my invention applied thereto; Fig. 2 an enlarged sectional detail corresponding to the line 2—2 of Fig. 1; and Fig. 3 a detail in sectional elevation of a further modification of the auxiliary spring.

In Fig. 1, 20 denotes an elliptic spring and 21 the end of a scroll spring hanger. The spring hanger 21 is shown as comprising approximately half of a scroll spring, but it is obvious that a full scroll spring can be used, merely duplicating at the other end of the spring 20 the construction shown at the end illustrated in the drawing. The lower or semi-elliptic spring 20 is shown as connected to the axle 1 and the upper spring to the frame 1ª. The lower spring is shown as provided with a rebound clip having the side plates 22 connected at their lower ends by a bolt 23 beneath the spring, the plates being connected by a cross plate 24 above the spring. This rebound clip may be provided with extensions 22ª of the sides 22, which extensions are adapted to receive the bolts 25 and 26 which are connected respectively to the eyes of the plates 27 and 28 of a V-shaped spring similar to the one shown in Fig. 1. These plates are concave on their upper and lower faces respectively whereby their convex surfaces are presented toward each other. The plate 28 is provided with an eye 29 which is adapted to receive a bolt 30 extending through a pair of shackle plates 31. The end of the plate 27 opposite the eye is substantially flat and rests upon a corresponding seat 27ª which may be formed on the eye 20ª of the spring 20.

32 denotes a bolt which extends through opposed slots 31ª in the shackle plates 31, said slots being located intermediate of the ends of the plates. The eye at the lower end of the spring 21 is connected to a bolt 33 extending through the bottoms of the shackle plates 31.

In operation, the V-shaped auxiliary spring formed by the plates 27 and 28 will more than support the normal load of the vehicle body. The two V-shaped springs for the axle 1 are adapted to carry from 50 to 100 pounds more than the normal load of the vehicle body with the passengers. The springs 21 and the body are therefore yieldingly suspended from the axle by the bolts 30 and 33 and the V-shaped springs. As the load is applied to these springs, the plates 27 and 28 cushion upon each other and, because of their peculiar shape, increase their bearing the one upon the other as the load increases. This insures a gradual and progressive absorption of load and shock. When the capacity of the auxiliary springs is exceeded, as by load or shock, the shackle plates 31 will be supported from the bolts 32, which then bear against the tops of the slots 31ª. At this time the spring 20 will come into full play and will take the load or shock additional to that which has been taken and absorbed by the auxiliary springs 21, 27 and 28. Furthermore, the portions of the spring 20 between the clip plates 22 and the eyes 27 will be strengthened or stiffened by the auxiliary springs, thus enabling the main springs to be made lighter than would be the case were the auxiliary springs omitted.

In Fig. 3 there is shown a modification of the auxiliary spring and the manner of connecting the same to the main spring. In this case the main spring (indicated generally at 34) is provided with clip plates 35 similar to the clip plates 22 of Fig. 2 and supported in like manner by means of the bolt 36 of the rebound clip 37. Through the upper ends of the shackle plates there extends a bolt 38 which forms a pivotal support for a U-shaped clip 39. This clip is provided with opposed openings 40 for a bolt 41, and this bolt extends through the openings 42 and 43 in the ends of the auxiliary spring plates 44 and 45 respectively. The outer ends of these plates will be connected to the end of the main spring in substantially the same manner as shown in Fig. 1. It will be observed that the ends of the branches of the clip 39 are rounded, whereby the plates 44 and 45 are permitted to separate under rebound without liability of breakage, as would be the case were they to engage sharp corners on the clip.

Having thus described my invention, what I claim is:

1. The combination, with a flat plate spring, of a spring having a scroll and extending about the end of the first mentioned spring, shackle links connected to the end of the scroll and extending on opposite sides of the eye of the first mentioned spring, a compression spring bearing against the eye of the first spring and located within the shackle links, and connections whereby the shackle will engage the eye of the first spring when the compression spring has been compressed to a predetermined extent.

2. The combination of a flat leaf spring, a scroll spring having an end extending about the end of the first mentioned spring, shackle plates connected to the eye of the scroll spring and extending on opposite sides of the eye of the first spring, a bolt extending through the eye of the first mentioned spring and through elongated slots in the shackle plates, a substantially V-shaped auxiliary spring having its diverging ends located above the eye of the first mentioned spring and between the shackle plates and having its apex connected to the body of the first mentioned spring, and a shackle pin extending through the eye of the upper branch of the V-shaped spring and through the upper ends of the shackle plates.

In testimony whereof I hereunto affix my signature in the presence of two witnesses.

MICHAEL M. McINTYRE.

Witnesses:
 HARRY E. FIGGIE,
 BRENNAN B. WEST.